(12) United States Patent
Brojanac et al.

(10) Patent No.: US 8,347,671 B2
(45) Date of Patent: *Jan. 8, 2013

(54) LOCKOUT DEVICE

(75) Inventors: Michael Brojanac, Jackson, WI (US);
Frank Scott, Milwaukee, WI (US);
Scott Czarnecki, Mukwonago, WI (US)

(73) Assignee: Master Lock Company LLC, Oak Creek, WI (US)

( * ) Notice: Subject to any disclaimer, the term of this patent is extended or adjusted under 35 U.S.C. 154(b) by 156 days.

This patent is subject to a terminal disclaimer.

(21) Appl. No.: 12/946,189

(22) Filed: Nov. 15, 2010

(65) Prior Publication Data

US 2011/0056567 A1 Mar. 10, 2011

Related U.S. Application Data

(63) Continuation of application No. 11/756,874, filed on Jun. 1, 2007, now Pat. No. 7,870,767, and a continuation-in-part of application No. 11/452,051, filed on Jun. 13, 2006, now Pat. No. 7,581,420.

(60) Provisional application No. 60/689,854, filed on Jun. 13, 2005.

(51) Int. Cl.
*F16K 35/10* (2006.01)
(52) U.S. Cl. ......... 70/178; 70/14; 70/18; 70/58; 70/180; 137/385
(58) Field of Classification Search ............... 70/14, 18, 70/19, 57, 58, 163, 164, 174, 175, 176, 177, 70/178, 180, 200–233, DIG. 63; 137/383, 137/384.8, 385
See application file for complete search history.

(56) References Cited

U.S. PATENT DOCUMENTS

| | | | |
|---|---|---|---|
| 1,749,491 A | 3/1930 | Kokay | |
| 1,867,922 A | 7/1932 | Nelson | |
| 2,323,654 A | 7/1943 | Gordy et al. | |
| 2,377,036 A | 5/1945 | Quarfoot | |
| 2,560,624 A | 7/1951 | Bartlett | |
| 2,724,295 A | 11/1955 | Persson | |
| 3,017,678 A * | 1/1962 | Christensen | 24/134 R |
| 3,592,028 A | 7/1971 | La Monica | |
| 3,599,960 A | 8/1971 | Phillips | |
| 3,667,259 A | 6/1972 | Reque et al. | |
| 3,703,821 A | 11/1972 | Dorey | |
| 3,744,096 A | 7/1973 | Kok | |
| 3,875,771 A | 4/1975 | Reisner | |

(Continued)

OTHER PUBLICATIONS

Office Action from U.S. Appl. No. 11/452,051 dated Mar. 20, 2009.

(Continued)

*Primary Examiner* — Christopher Boswell
(74) *Attorney, Agent, or Firm* — Calfee, Halter & Griswold LLP

(57) ABSTRACT

A lockout device is provided for an instrument having a body and an actuating member extending from the body for operating the instrument. The lockout device includes a bottom member, a cover member, and a flexible member. The bottom member and cover member are adapted to receive a cinching portion of the flexible member between first and second holding surfaces of the bottom member and cover member. When the flexible member is wrapped around a portion of the body and received between the first and second holding surfaces and the cover member is in a closed position, the first and second holding surfaces prevent movement of a cinching portion of the flexible member.

17 Claims, 15 Drawing Sheets

U.S. PATENT DOCUMENTS

| | | | |
|---|---|---|---|
| 3,980,099 | A | 9/1976 | Youngblood |
| 4,685,315 | A | 8/1987 | Comolli |
| 4,864,834 | A | 9/1989 | Waite |
| 4,878,270 | A * | 11/1989 | Westerkamp ............... 24/132 R |
| 4,891,866 | A | 1/1990 | Kasai |
| 5,003,797 | A | 4/1991 | Wirth et al. |
| 5,020,342 | A | 6/1991 | Doan et al. |
| 5,165,263 | A | 11/1992 | Perron et al. |
| 5,167,135 | A | 12/1992 | Gobeski |
| 5,213,308 | A | 5/1993 | Jeromson et al. |
| 5,244,101 | A | 9/1993 | Palmer et al. |
| 5,261,177 | A | 11/1993 | Armstrong |
| 5,300,740 | A | 4/1994 | Benda |
| 5,365,757 | A | 11/1994 | Primeau |
| 5,415,017 | A | 5/1995 | Benda et al. |
| 5,517,835 | A * | 5/1996 | Smith ............................... 70/14 |
| 5,572,771 | A | 11/1996 | Kelleghan |
| 5,582,042 | A | 12/1996 | Mordick |
| 5,598,724 | A | 2/1997 | Primeau |
| 5,664,597 | A | 9/1997 | Miskiewicz |
| 5,806,555 | A | 9/1998 | Magno, Jr. |
| 5,823,020 | A * | 10/1998 | Benda ............................... 70/18 |
| 5,881,582 | A | 3/1999 | Monaco |
| 6,116,278 | A | 9/2000 | Baumgardner et al. |
| 6,510,717 | B1 | 1/2003 | Levi |
| 6,557,384 | B1 | 5/2003 | Cuesta |
| 6,622,532 | B2 | 9/2003 | Hsu |
| 6,622,536 | B1 | 9/2003 | Fuller et al. |
| 6,755,054 | B2 | 6/2004 | Burmesch et al. |
| 6,997,420 | B2 | 2/2006 | Yudis et al. |
| 7,000,438 | B1 | 2/2006 | Cooper et al. |
| 7,121,122 | B2 | 10/2006 | Levi |
| 7,124,606 | B2 | 10/2006 | Turek |
| 7,293,438 | B2 | 11/2007 | Benda |
| 7,581,420 | B2 | 9/2009 | Manthe et al. |
| 7,870,767 | B2 * | 1/2011 | Brojanac et al. ................ 70/178 |
| 8,074,960 | B2 * | 12/2011 | Milbeck et al. ................ 70/178 |
| 2004/0159133 | A1 | 8/2004 | Marcelle et al. |

OTHER PUBLICATIONS

Office Action from U.S. Appl. No. 11/452,051, dated Sep. 16, 2008.
International Search Report and Written Opinion of the International Search Authority from International Application No. PCT/US07/14723, dated Feb. 22, 2008, 10 pages.
International Search Report and Written Opinion from PCT International Application No. PCT/US06/22949, dated Aug. 3, 2007, 10 pages.

* cited by examiner

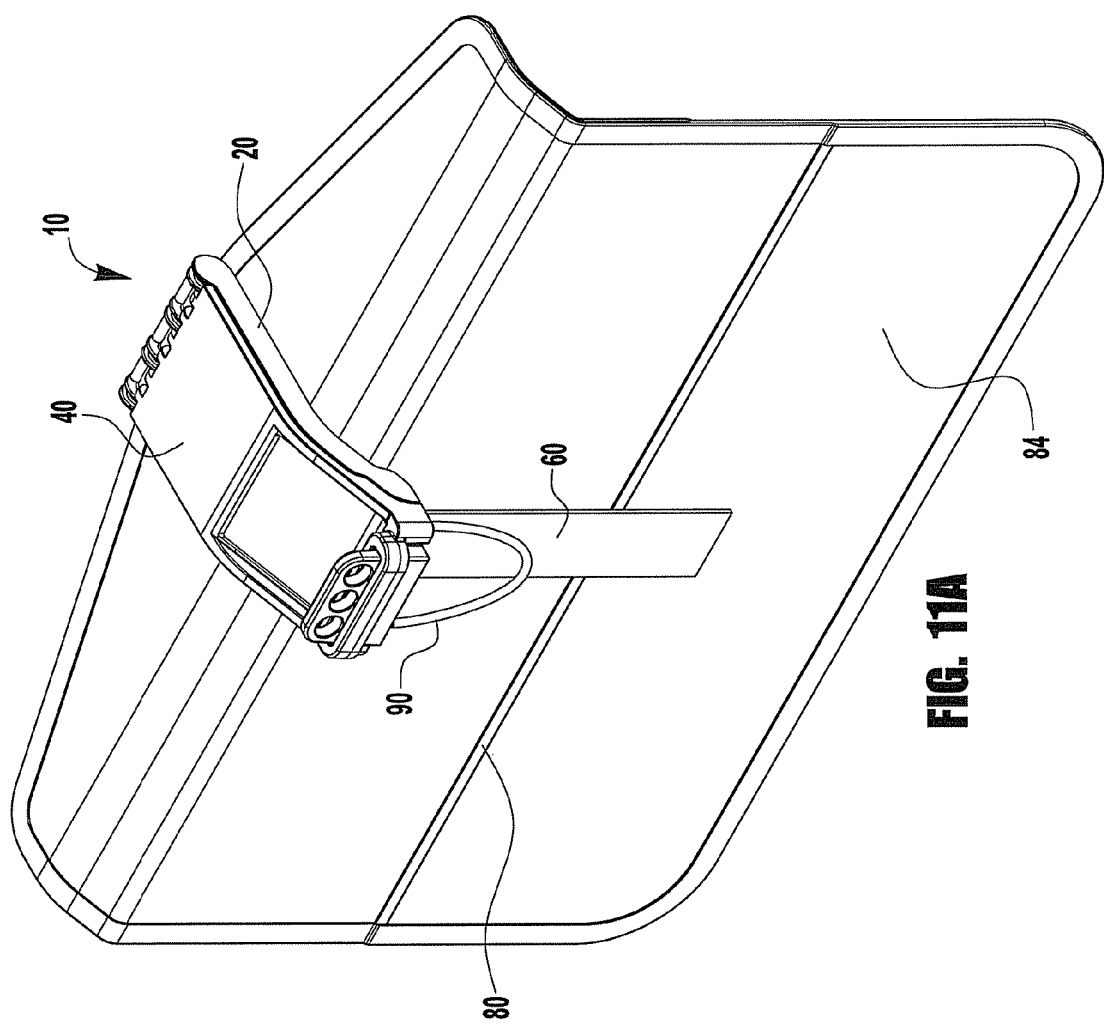

LOCKOUT DEVICE

CROSS-REFERENCE TO RELATED APPLICATION

This application is a continuation of co-pending U.S. application Ser. No. 11/756,874, filed Jun. 1, 2007 and entitled "Lockout Device," which is a continuation-in-part of U.S. application Ser. No. 11/452,051, filed Jun. 13, 2006 and entitled "Lockout Device," now U.S. Pat. No. 7,581,420, which claims the benefit of U.S. Provisional Application Ser. No. 60/689,854, filed Jun. 13, 2005, all of which are incorporated by reference in their entirety to the extent that they are not inconsistent with the present application.

BACKGROUND

Security devices, such as for example, padlocks and other types of conventional locks are known in the art. Many security devices are provided for restricting access to equipment and control instruments, including, for example, electrical components, such as switches, dials and push buttons, and fluid system components, such as valves and pressure regulators. One exemplary security device is a valve lockout device to prevent the operation of a valve, which may be utilized during maintenance of the associated fluid system or under other conditions in which the flow setting of the valve must not be changed.

Valve lockout devices typically restrict movement of the handle attached to a valve stem configured to actuate the valve. These devices generally use a feature to stop, resist, push, or pull against the body of the valve or the conduit attached directly to the valve. Due to the large number of valve manufacturers and the wide variety of valve sizes, conduit sizes, valve body shapes and valve handle dimensions, the types of valves with which a single such device design may be used is limited, requiring retention of several types or sizes of handle restricting valve lockout devices to accommodate the many types and sizes of valves in service at a typical plant. In addition, the installed position and location of the valve itself can vary. The orientation of the valve (vertical or horizontal) and the clearance of the valve from a wall, piping, or other pieces of equipment may affect the ability of a lockout device to be assembled with a valve. Moreover, in certain designs, if a lever style handle is attached to a valve and the valve is locked out in any other position except open, the handle extends beyond the envelope of the valve body. In this condition, the handle becomes a moment arm that may be dislodged with sufficient force, compromising the locked out state of the valve.

SUMMARY

The present application describes lockout devices for operable instruments, including fluid systems components, such as, for example, flow regulating, shutoff, and flow switching valves. Many such valves are operable by manual manipulation of an actuating member, such as, for example, a valve stem, which extends from the valve body and may be rotated, pulled, pushed, or otherwise moved to alter the flow of a system fluid through the valve. Examples of such valves include ball valves, gate valves, needle valves, toggle valves, and diaphragm valves. With many valves, a separate valve handle is attached to the actuating member to facilitate movement of the actuating member by providing an extension that is easy to grasp and manipulate. Drawbacks of such a handle are that in circumstances in which lockout of the valve is desired, the size and shape of the handle may limit the type of lockout device with which the valve may be assembled, and in many cases, all or part of the handle may still be accessed, presenting opportunities for tampering or accidental impact with the handle. By providing a lockout device that is adapted to assemble over the valve actuating member after the handle is removed, both of these drawbacks are eliminated.

In an embodiment of the present application, a valve lockout device is provided with a cover for restricting access to the valve actuating member, and a flexible member attached to the cover that may be tightened around the valve body to secure the cover to the valve.

BRIEF DESCRIPTION OF THE DRAWINGS

Further features and advantages will become apparent from the following detailed description made with reference to the accompanying drawings, wherein:

FIG. 11A is a perspective view of a lockout device;

DETAILED DESCRIPTION

Figure 1:
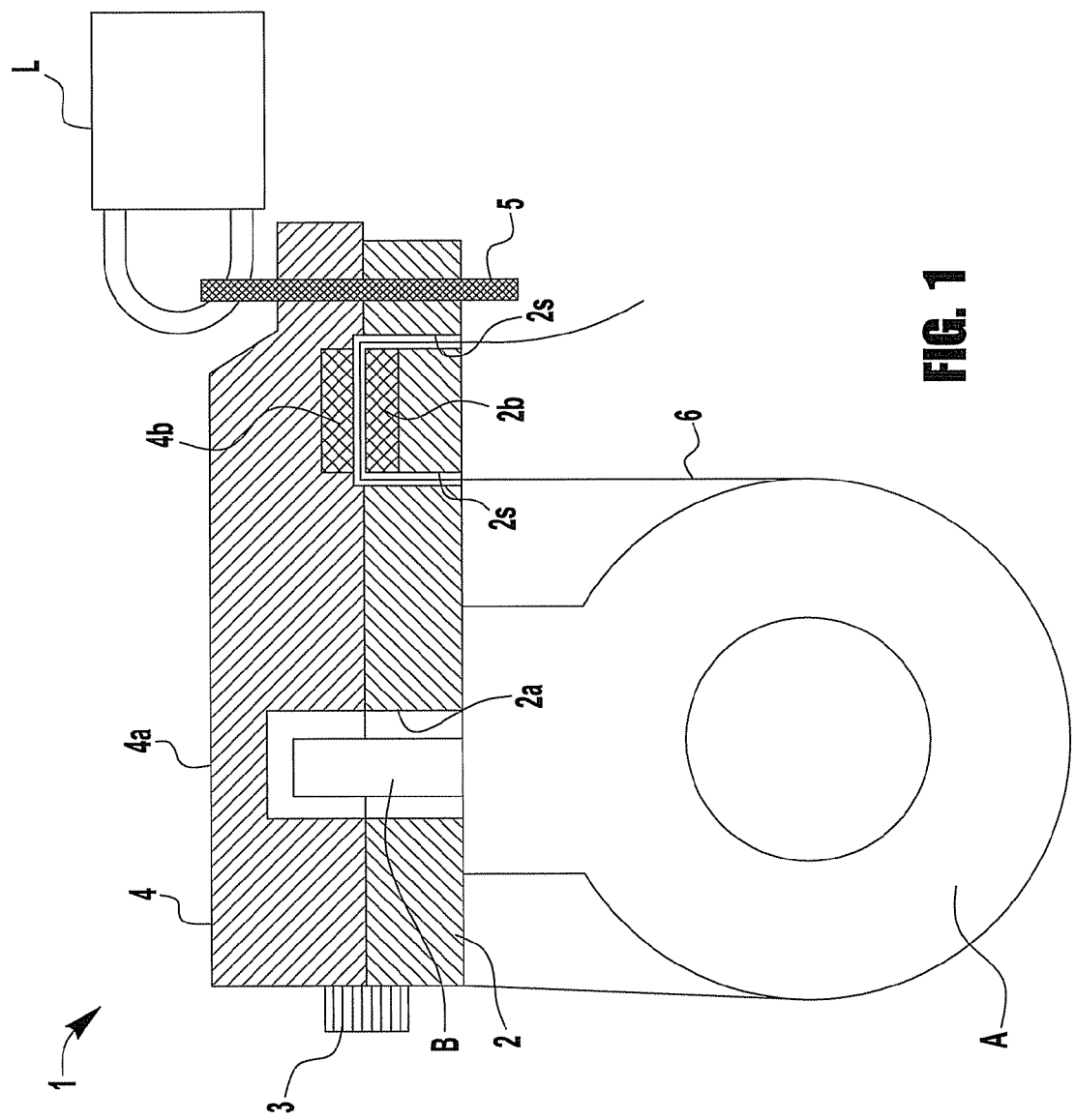
FIG. 1 illustrates a cross sectional schematic view of a lockout device in a closed or lockout position.

This Detailed Description merely describes embodiments of inventive aspects of the present application and is not intended to limit the scope of the claims in any way. Indeed, the inventive features described by the claims are broader than and unlimited by the preferred embodiments, and the terms in the claims have their full ordinary meanings.

The present application contemplates a lockout device for preventing access to or operation of an instrument, such as, for example, a valve, by covering an actuating member extending from the instrument to restrict access to the actuating member. In one embodiment, the lockout device may include a cover and a flexible member attached to the cover that may be tightened around the instrument to secure the cover over the actuating member. The device may be provided with one or more of the inventive features disclosed herein to provide improved adaptability, security, safety and/or convenience. For example, a device may be adapted for assembly with different types and sizes of valves. In some applications, a lockout cover may be sized to cover the valve with a handle still assembled to the valve, particularly if a smaller handle is used with the valve, such as a knob handle or plunger-style handle. In other applications, the valve handle may be disassembled from the actuating member prior to installation of the valve lockout device. In one such application, a storage compartment, such as a bag or pouch, may be provided with the lockout device for local storage of the removed valve handle and any related hardware.

In one exemplary embodiment, a lockout device may include a flexible member, such as a locking strap, for tightening around the valve body to secure a cover to the valve body to block access to the valve's actuating member. The flexible member may be provided with a length sufficient to accommodate valve bodies of varying sizes. As another example, the device may include a base and a cover, between which a portion of the flexible member may be cinched to prevent loosening of the flexible member. As yet another example, the device may include a mechanism to lock the base and cover together to maintain a cinched condition of the flexible member until the mechanism is unlocked and the cover is separated from the base.

While the figures and descriptions illustrate and describe an embodiment adapted for use with a valve, many of the features of the exemplary embodiments may be used with lockout devices for different types of instruments, such as, for example, electrical controls. The device may be beneficial for many applications where an instrument must be locked, such as, for example, in applications where maintenance personnel are servicing a fluid system or factory equipment with which a fluid system is connected, where an instrument, such as a valve, is known to be faulty, or where a control setting must not be altered. As one example, the device can be used to lock a valve in a desired flow setting or position, such as, for example, open, closed, or a set flow rate, by use of a conventional locking type device or locking member, such as, for example, a padlock, hasp, cable or similar object. Applications may include permanent and temporary lockouts. The devices according to the present application may be durable under normal use and may be used indefinitely.

FIG. 1 schematically illustrates an exemplary lockout device 1 including some inventive aspects of the present application, while FIGS. 2A-14 illustrate more specific exemplary embodiments. The device 1 is shown assembled over an actuating member B of a valve A to restrict access to or operation of the valve A. The illustrated device 1 includes a bottom member 2 and a cover member 4. As contemplated by the present application, the cover member 4 and bottom member 2 may be attached at an attachment portion 3. The cover member 4 and bottom member 2 may be attachable to each other at attachment portion 3 in one of many different ways, such as, for example, interlocking slots and tabs, fasteners, hinges, or a flexible web between base and cover member portions of a one-piece design. Another exemplary embodiment may rely on the installation of a padlock or other locking member to secure the separate cover member to the bottom member.

Figure 2A:
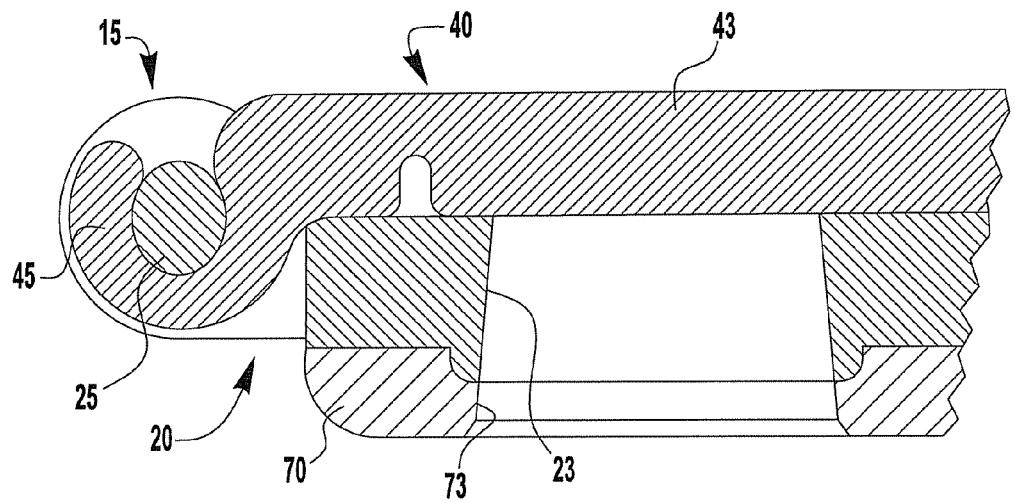
FIG. 2A is a side cross-sectional view of a hinge portion of a lockout device in a lockout position.
Figure 2B:
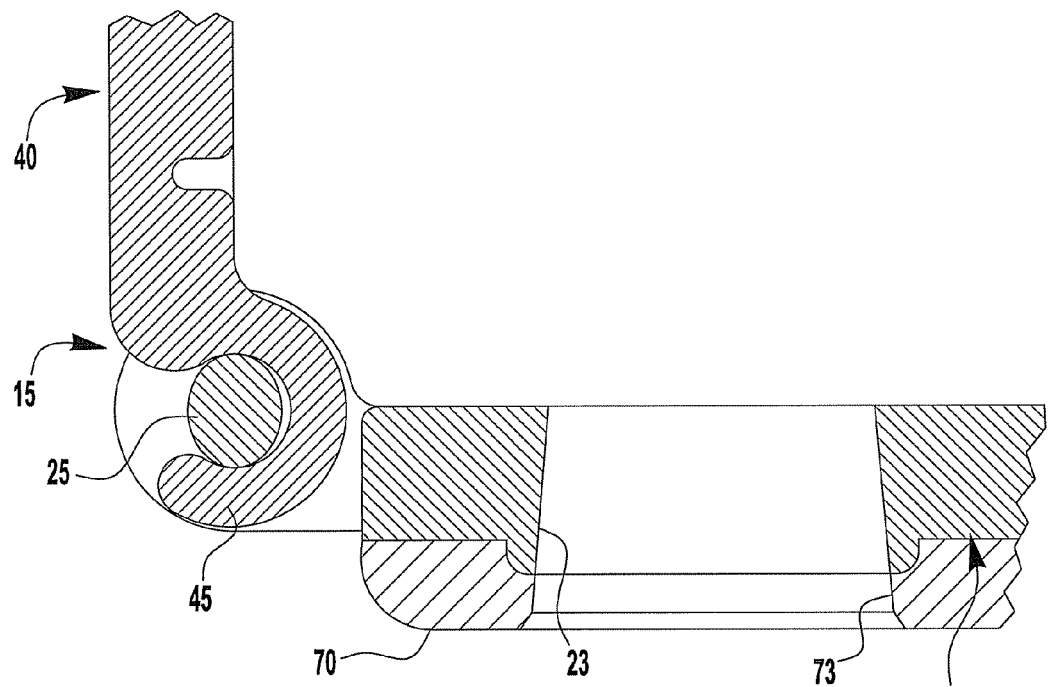
FIG. 2B is a side cross-sectional view of the hinge portion of FIG. 2A in an open position.

In the illustrated embodiments of FIGS. 2A-14, as shown most clearly in FIGS. 2A and 2B, the cover member 40 is hinge mounted to the bottom member 20 at a hinge portion 15, such that the cover member 40 may pivot with respect to the bottom member 20, between an open position and a closed or lockout position. In one embodiment, the hinge portion 15 may include a hinge pin on one of the cover member and the bottom member, and a hinge leaf on the other of the cover member and the bottom member. Either one or both of the hinge pin and hinge leaf may be provided with an elliptical cross section, such that when the cover member is pivoted to the open position, the elliptical hinge pin and/or hinge leaf acts to bias the cover member to remain in the open position. In the illustrated embodiment, as shown in FIGS. 2A and 2B, the bottom member 20 is provided with an elliptical hinge pin 25, and the cover member 40 is provided with an elliptical hinge leaf 45.

As shown schematically in FIG. 1, the cover member 4 includes a covering portion 4a which covers an opening 2a in the bottom member 2 when in the lockout position. The opening 2a may be sized to receive an actuating member B (such as, for example, a valve stem) extending from a side of the valve body A, such that closure of the cover member will selectively restrict access to the actuating member B, while allowing access to the actuating member when the cover member 4 is opened. While an exemplary covering portion 43 of the specific illustrated embodiments (see FIG. 2A) is shown as a flat surface, the covering portion may also be provided with an upward contoured or cup-shaped surface to receive the endmost portion of the actuating member, or with any other surface suitable for accommodating the actuating member.

While many materials may be used to construct the bottom member and cover member, a resilient and durable plastic material may be chosen to provide flexibility to accommodate a durable, snap fit engagement between the bottom member and the cover member. In one embodiment, the bottom member may be provided in 5% glass filled polypropylene. In another embodiment, at least the covering portion 4a of the cover member 4 is provided in a transparent material, such as, for example, a clear or tinted plastic material, to provide visibility of an upper surface of the actuating member when the cover member 4 is in the lockout position. As the actuating member or valve stem of many types of valves provides a visual indication of the position of the position of the valve, such as directional markings or positioned stem flats, visibility of the actuating member during lockout may allow the user to quickly ascertain the position or setting of the valve. One example of such a material is PC Lexan 920A. The cover member 4 may also be provided with a display surface upon which labels containing warnings, safety instructions or other indicia may be placed, which may further identify the position or condition of the valve.

As shown in FIG. 1, the lockout device may include a flexible member 6, such as, for example, a strap, cable, chain, or rope, that may be connected with the bottom member 2 and/or cover member 4, tightened around a portion of an instrument, such as the body of a valve A, and secured to the bottom member 2 and/or cover member 4 at a separate portion of the flexible member to secure the cover on the instrument. In one embodiment, a cinch strap or locking strap 6 is directly or indirectly connected at one end to a bottom member 2 and/or cover member 4, such that the strap may be tightened around a valve body A to secure the bottom member and cover member over an actuating member extending from the valve body, with a portion of the strap 6 being secured between the bottom member 2 and the cover member 4 to prevent loosening of the strap 6. The locking strap 6 may be sized to be a sufficient length to be tightened around valve bodies of a wide range of sizes and shapes. For example, the lockout device 1 may be provided with a locking strap approximately 36 inches in length to accommodate most valves in ⅜" to 4" piping systems. While the flexible member may be provided in many different materials to accommodate a variety of applications, a durable and flexible plastic material may be chosen to withstand repeated use and high tension forces. In one embodiment, the strap is provided in 100% polypropylene fibers.

As shown schematically in FIG. 1, the bottom member 2 and the cover member 4 of the lockout device may be provided with opposed holding portions 2b, 4b adapted to hold or cinch a portion of a locking strap 6 between the two holding portions when the cover member 4 is in the lockout position, preventing a cinching portion of the strap 6 from moving and preventing the locking strap 6 from being loosened from the valve body A during lockout. The opposed holding portions 2b, 4b may include a number of different cinching features, including, for example, opposed frictional surfaces, interlocking teeth, holes aligned with spikes, or a combination of any of these and other such features. In one such embodiment, a first cinching feature includes one or more cinch pins, and a second or opposed cinching feature includes one or more corresponding recesses configured to receive the cinch pins when the cover member is in a closed or lockout position. The cinch pins may be adapted to engage locations between woven threads in the strap to more tightly secure the strap, and in some applications, may be provided with a sharpened end portion to pierce the weave of the strap to more aggressively cinch and secure the strap.

Figure 3:
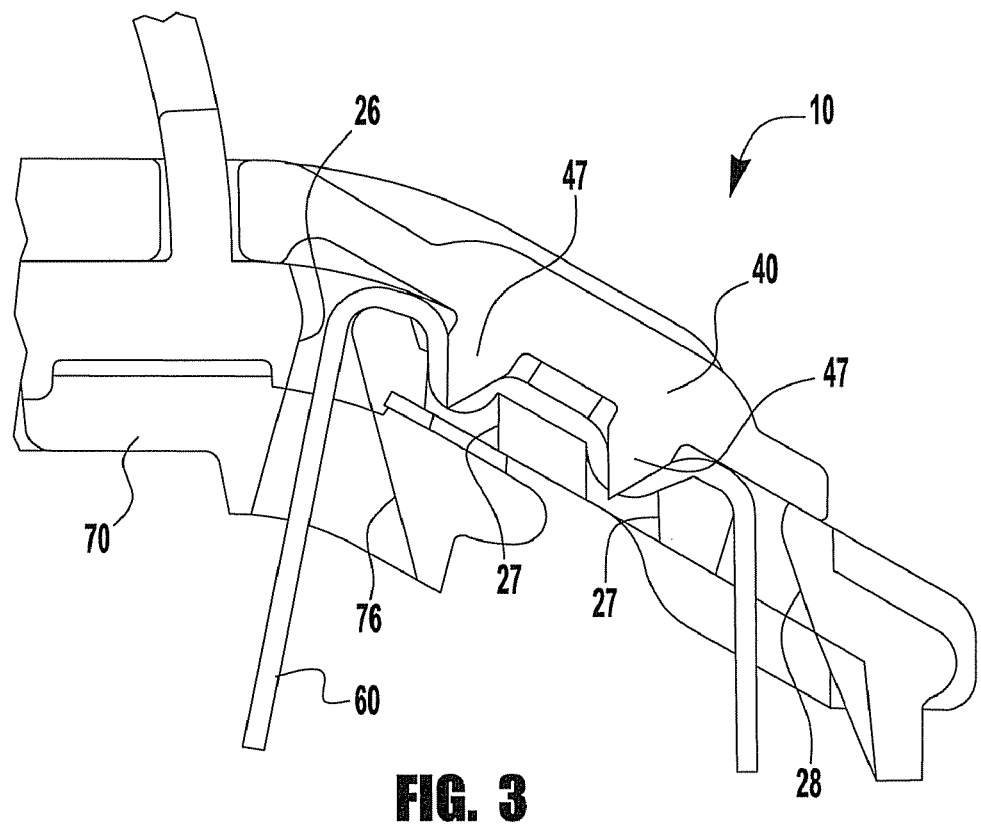
FIG. 3 is a partial side cross-sectional view of a lockout device in a lockout position.
Figure 4:
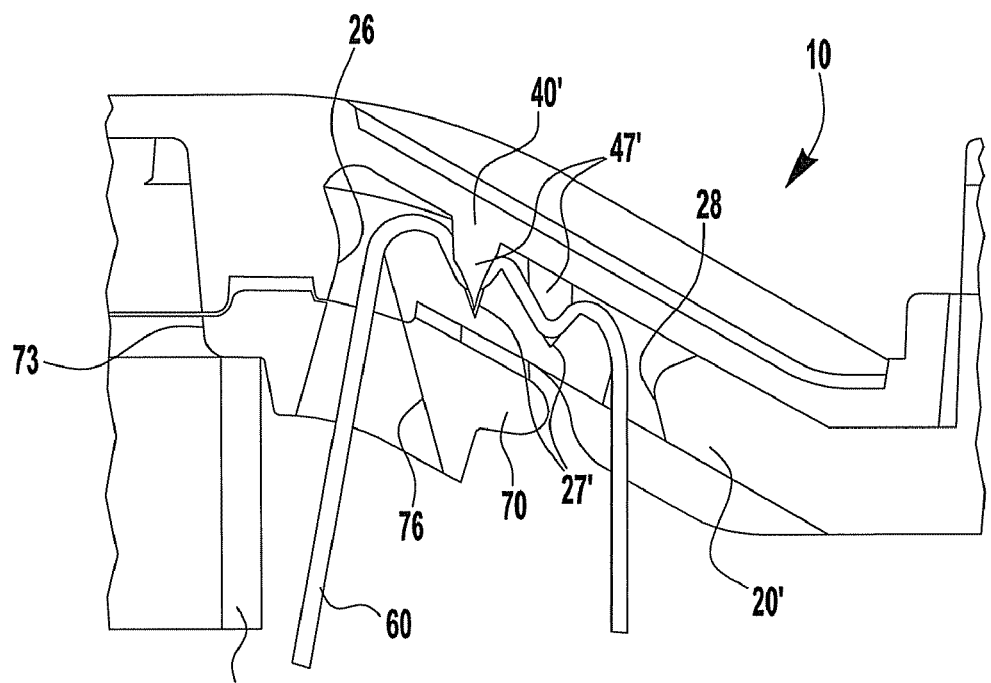
FIG. 4 is a partial side cross-sectional view of another lockout device in a lockout position.
Figure 7A:
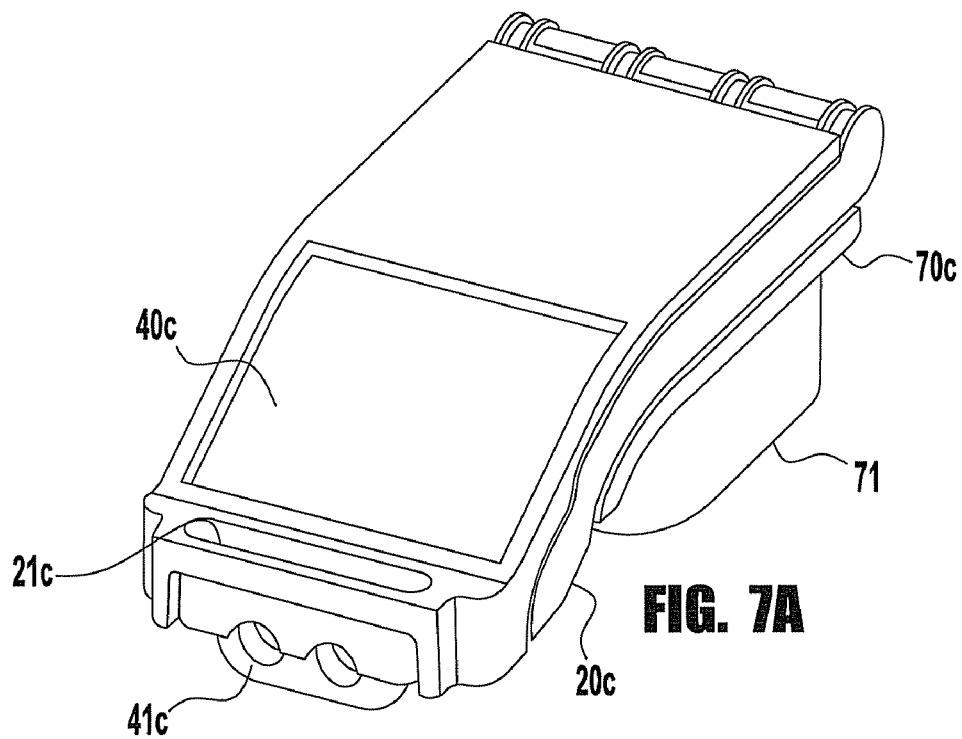
FIG. 7A is a perspective view of another lockout device in a closed condition.
Figure 7B:
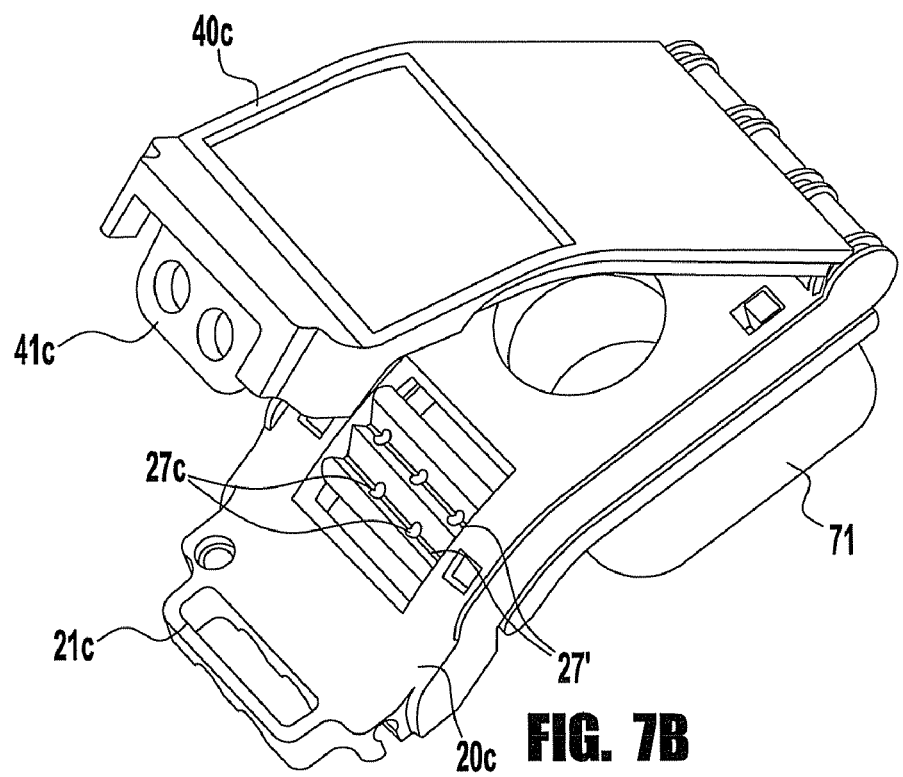
FIG. 7B is a perspective view of the lockout device of FIG. 7A in an open condition.

As illustrated in FIG. 3 (and also shown, for example, in the embodiment of FIGS. 5A-5B), the cover member 40 may include a plurality of cinch pins 47, and the bottom member 20 may include a plurality of complementary shaped holes 27 for receiving the pins 47 when the cover member 40 is in the closed position. As another example, as illustrated in FIG. 4 (and also shown, for example, in the embodiment of FIGS. 8A-8B), the cover member 40' may include a plurality of cinch pins 47' and the bottom member 20' may include one or more corresponding grooves 27' configured to receive the pins 47' when the cover member 40' is in the closed position. In another exemplary embodiment, as shown in the embodiment of FIGS. 7A-7B, grooves 27' in the bottom member 20c may include holes 27c aligned to receive end portions or tips of the cinch pins 47' when the cover member 40c is in the lockout position.

The cinch pins 47 may be orthogonal to the cinching portion of the strap 60 when the cover member 40 is in the closed position for gripping the strap (see FIG. 3). In another embodiment, shown in FIG. 4, the cinch pins 47' may be angled or non-orthogonal to the cinching portion of the strap 60 when the cover member 40 is in the closed position, such that the cinch pins 47' more aggressively grip the strap 60 when the strap is pulled in a loosening direction, which may more effectively secure the lockout device 10 to the valve body A.

As schematically shown in FIG. 1, to receive the flexible member 6 between the bottom member 2 and the cover member 4 for cinching, slots or other such openings 2s may be provided in either or both of the bottom member and cover member. As shown in FIGS. 3 and 4, first and second or entry and exit strap slots 26, 28 may be provided in the bottom member 20 on either side of the holding portion 27, such that the locking strap 60 may be inserted up through entry slot 26, stretched over the holding portion 27, and inserted back down through exit slot 28. The slots 26, 28 may be positioned such that the free end 68 of the strap 60 extending from exit slot 28 may be easily pulled to tighten the strap 60 against the valve body A.

According to the present application, the lockout device may be provided with a mechanism for locking the cover member and bottom member together in the closed or lockout position, to prevent unauthorized operation of the locked out valve. One example of such a mechanism is a flange or plate extending from the device, including one or more apertures, such as holes or slots, through which one or more locking members, such as a padlock or cable, may be inserted to obstruct movement of the cover member from the lockout position. As shown schematically in FIG. 1, the device 1 may include a lock bar 5 extending from one of the base member 2 and the cover member 4, such that assembly of a locking member L with the lock bar 5 prevents movement of the cover member 4 from the closed position to the open position. In the illustrated exemplary embodiments of FIGS. 5A-5B, 6A-6B, 7A-7B, and 8A-8B, the lock bar portions 21a, 21b, 41c, 21d each define a plurality of locking apertures 24 adapted to receive a padlock shackle or other such locking member. While a lock bar may be provided with only one locking aperture, the availability of multiple locking apertures 24 allows for the use of multiple locking members to provide added security against unauthorized use of the valve.

Figure 5A:
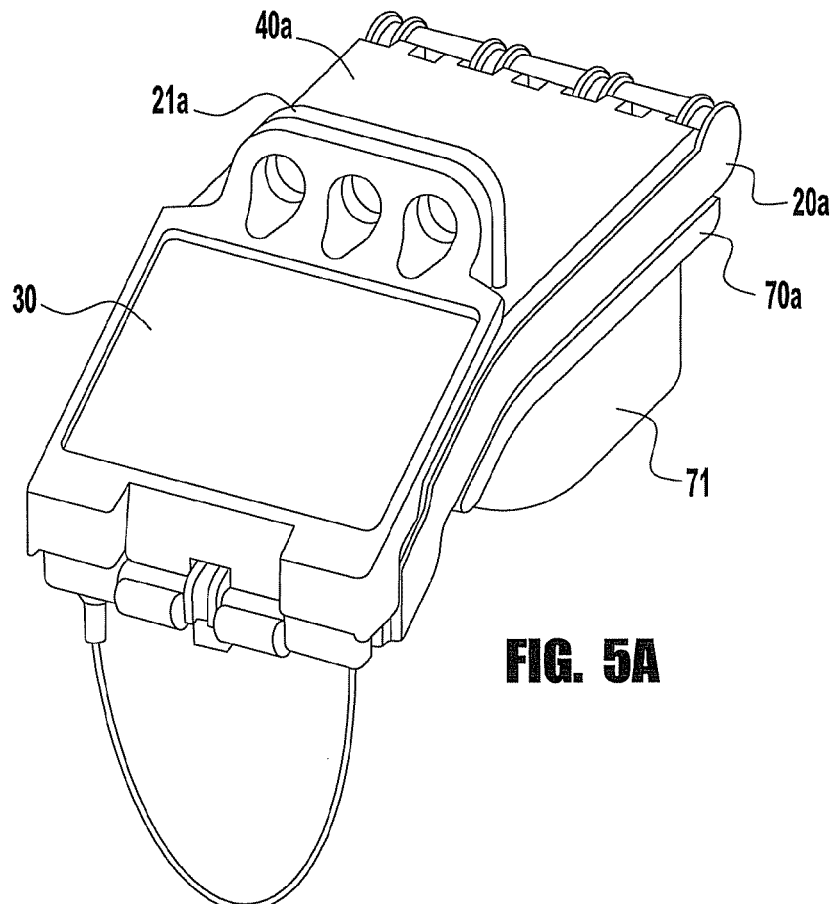
FIG. 5A is a perspective view of a lockout device in a closed condition.
Figure 5B:
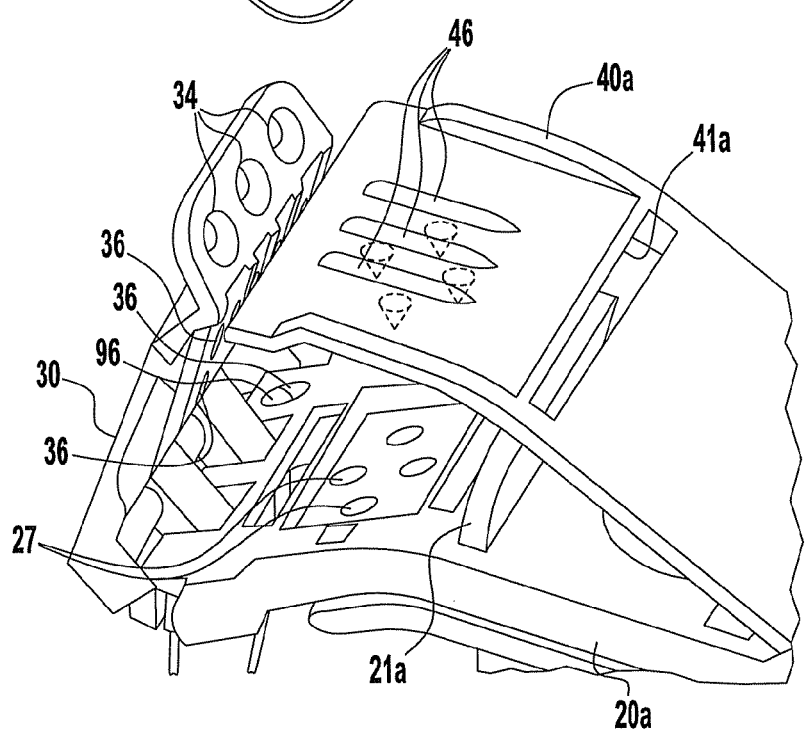
FIG. 5B is a perspective view of the lockout device of FIG. 5A in an open condition.
Figure 6A:
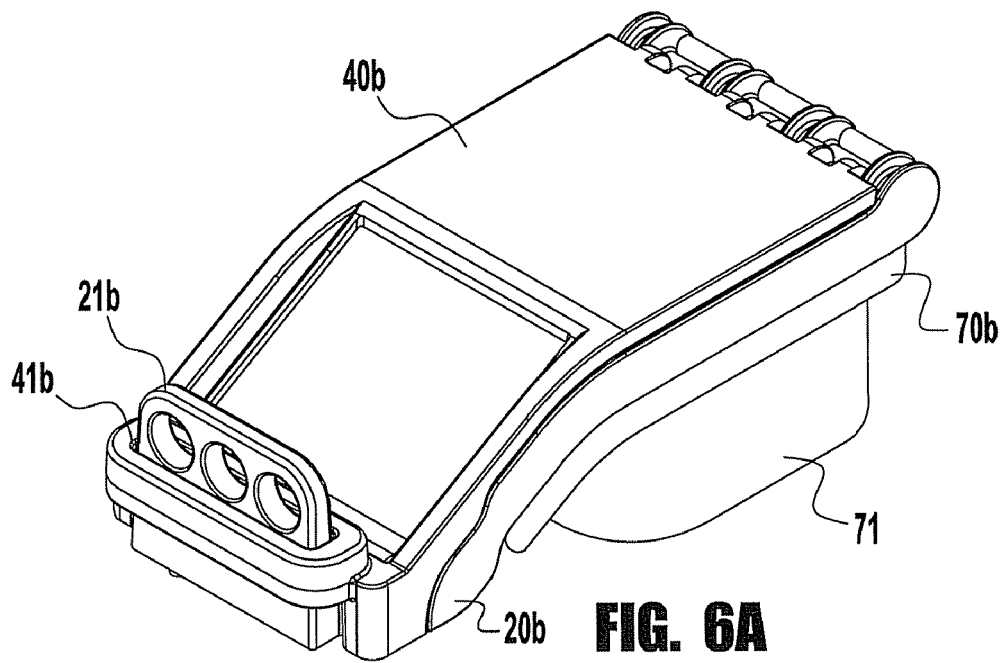
FIG. 6A is a perspective view of another lockout device in a closed condition.
Figure 6B:
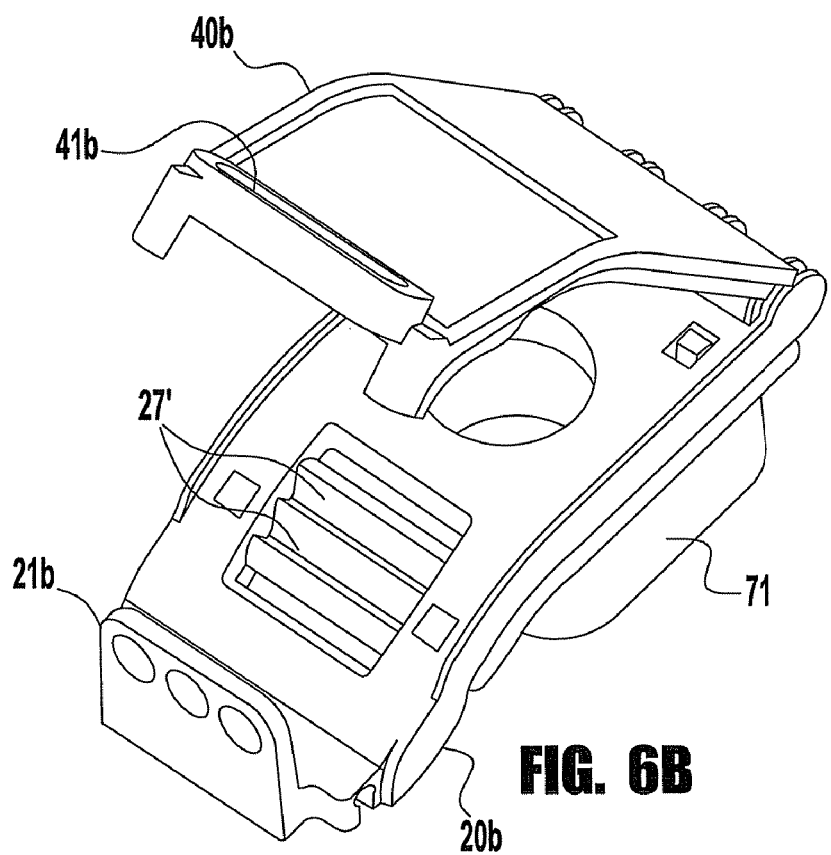
FIG. 6B is a perspective view of the lockout device of FIG. 6A in an open condition.
Figure 8A:
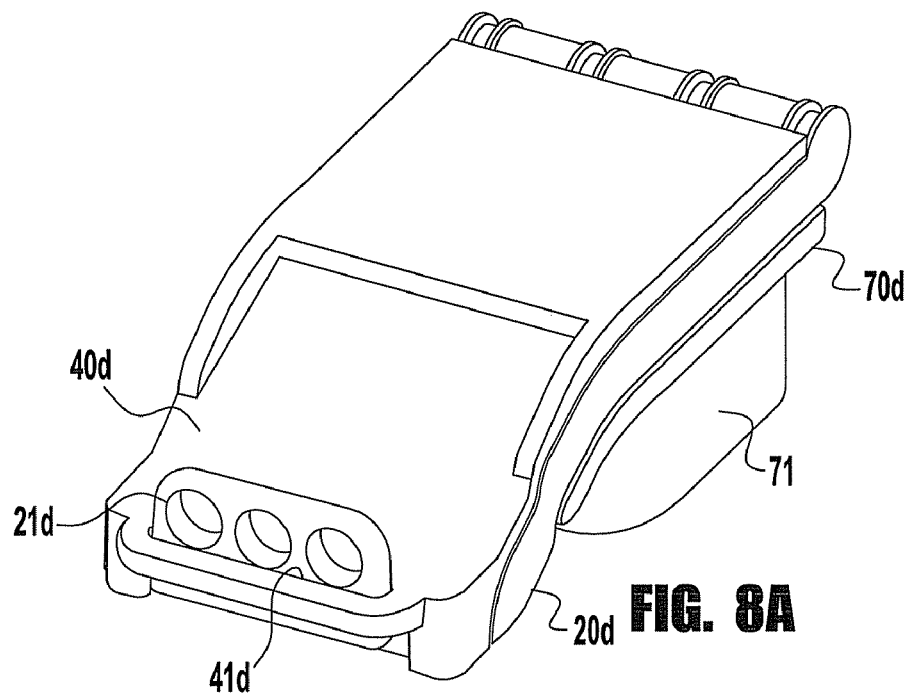
FIG. 8A is a perspective view of another lockout device in a closed condition.
Figure 8B:
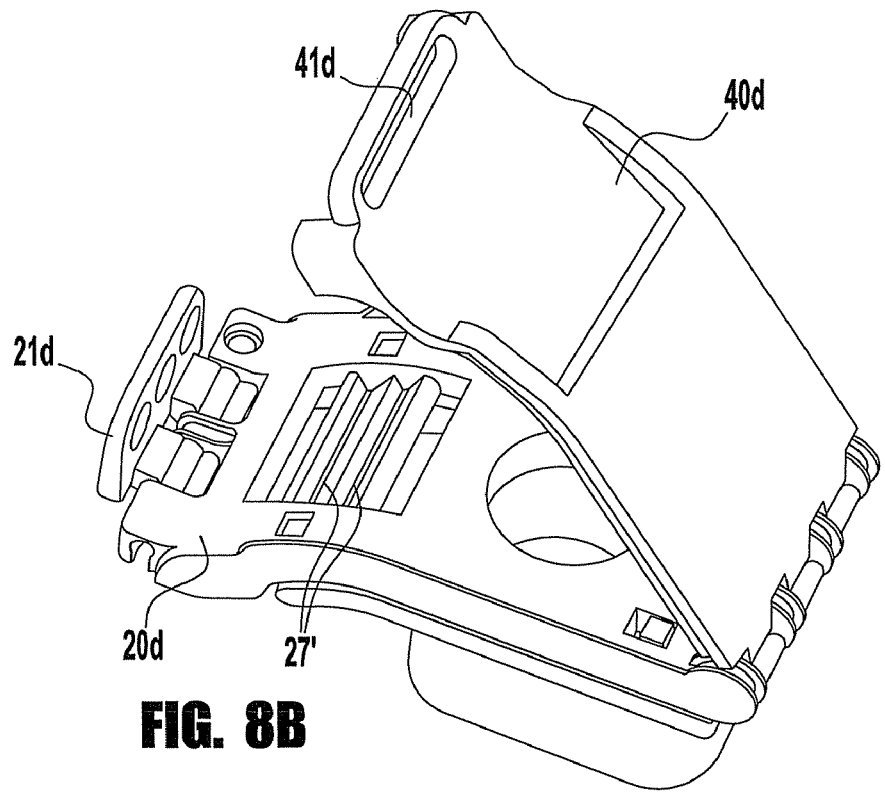
FIG. 8B is a perspective view of the lockout device of FIG. 8A in an open condition.

A lock bar portion for securing the cover member in the closed position may be provided in many different forms and on many different locations of one of the bottom member and cover member to extend past many different portions of the other of the cover member and bottom member, including outer edges or openings, such that the inserted locking member will block movement of the cover member from the lockout position. As shown in FIGS. 5A-5B, the lock bar 21a may extend from a generally central portion of the bottom member 20a through an opening 41a in the cover member 40a when the cover member 40a is closed. In another embodiment, as shown in FIGS. 6A-6B, the lock bar 21b extends from a front portion of the bottom member 20b through a slotted tab 41b at the front of the cover member 40b when the cover member 40b is closed. While the lock bar may extend from the bottom member 20a, 20b as shown in FIGS. 5A-5B and 6A-6B, in another embodiment, as shown in FIG. 7A-7B, the lock bar 41c extends from the cover member 40c through a slot 21c in the bottom member 20c when the cover member 40c is closed. Further, while the lock bar may be integrally formed, for example, by injection molding, with one of the bottom member and cover member (as shown in the embodiments of FIGS. 5A-5B, 6A-6B, and 7A-7B), the lock bar need not be integral to the bottom member, as it may be attached to the bottom member in some other fashion. As one example, as shown in FIGS. 8A-8B, a lock bar 21d may be hinge mounted to the front of the bottom member 20d, to facilitate insertion of the lock bar 21d through a corresponding slot 41d in the cover member 40d.

According to the present application, the lockout device may also be provided with additional features or mechanisms separate from the lock aperture for retaining the cover member in the closed or lockout position. Some examples of such mechanisms include snap-fit mating surfaces, clasps, fasteners, or other such components. One such exemplary device is disclosed in co-pending U.S. Application Publication No. 2006/0283215, entitled Lockout Device and filed on Jun. 13, 2006, the entire disclosure of which is incorporated by reference herein, to the extent that it is not conflicting with the present application.

Figure 9A:
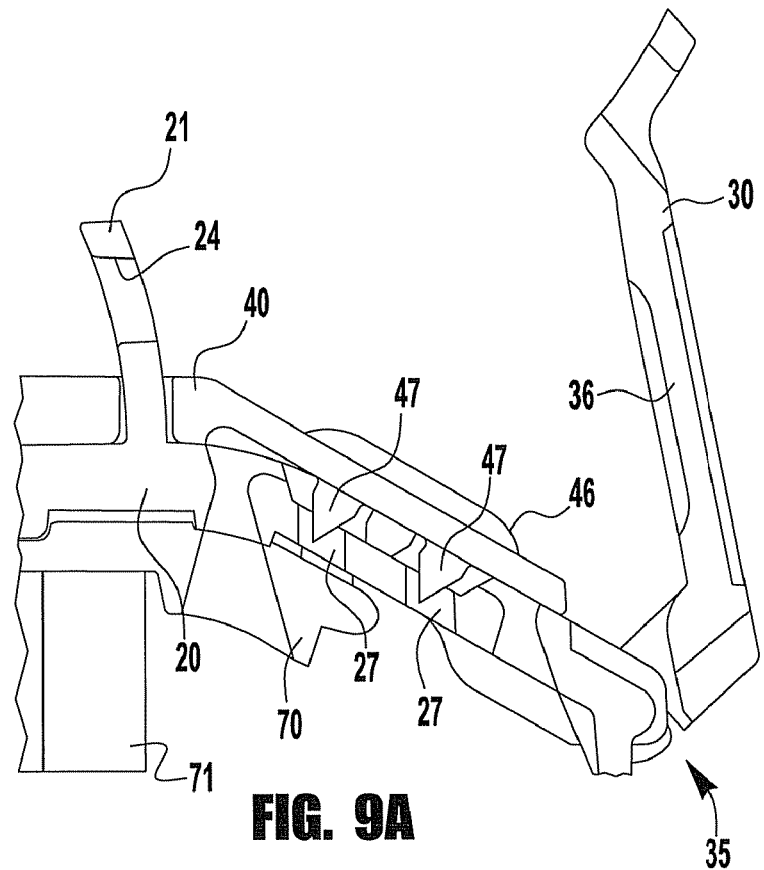
FIG. 9A is a side cross sectional view of a lockout device, shown without the locking strap for clarity.
Figure 9B:
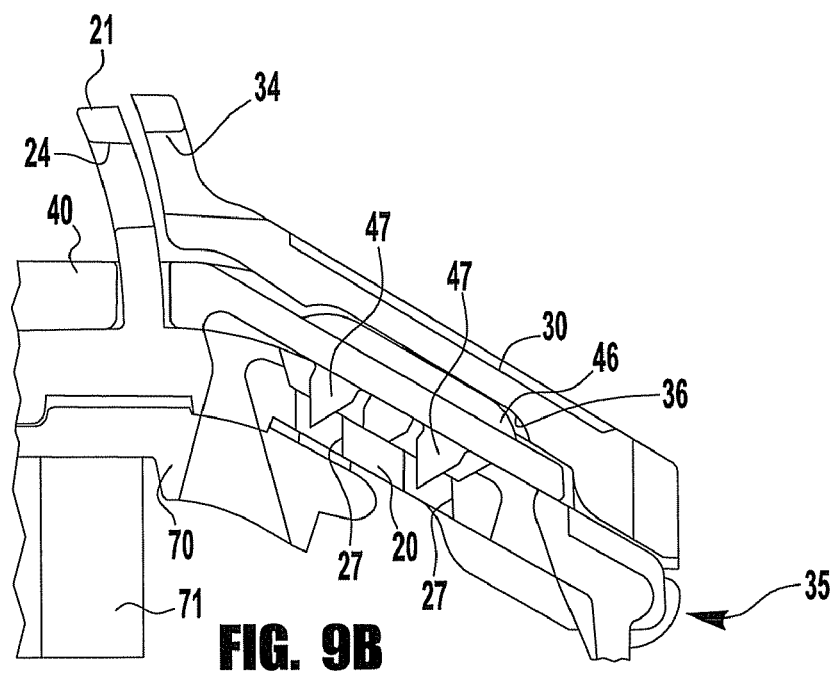
FIG. 9B is a side cross sectional view of the lockout device of FIG. 9A, showing the latch plate in a position of initial engagement with the cover member.
Figure 9C:
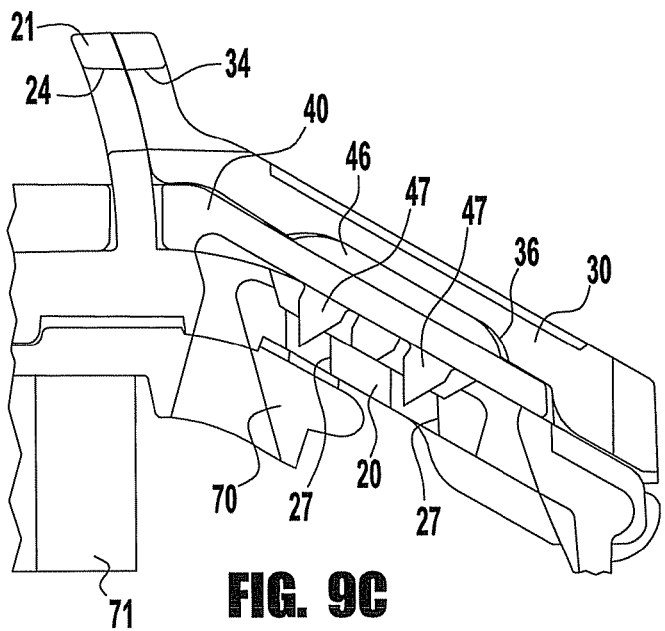
FIG. 9C is a side cross sectional view of the lockout device of FIG. 9A, showing the latch plate in a fully compressed or latching position.
Figure 10A:
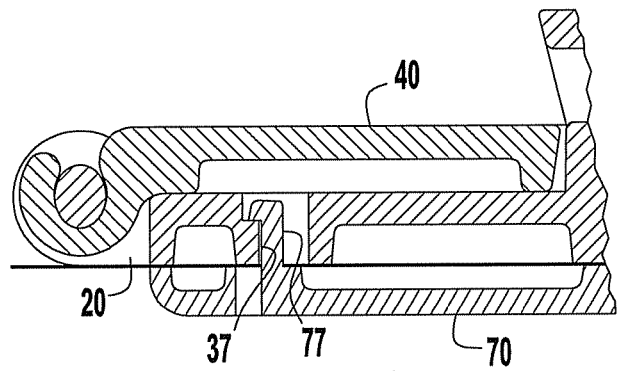
FIG. 10A is a side cross-sectional view of a mounting member and bottom member attachment portion of a lockout device.
Figure 10B:
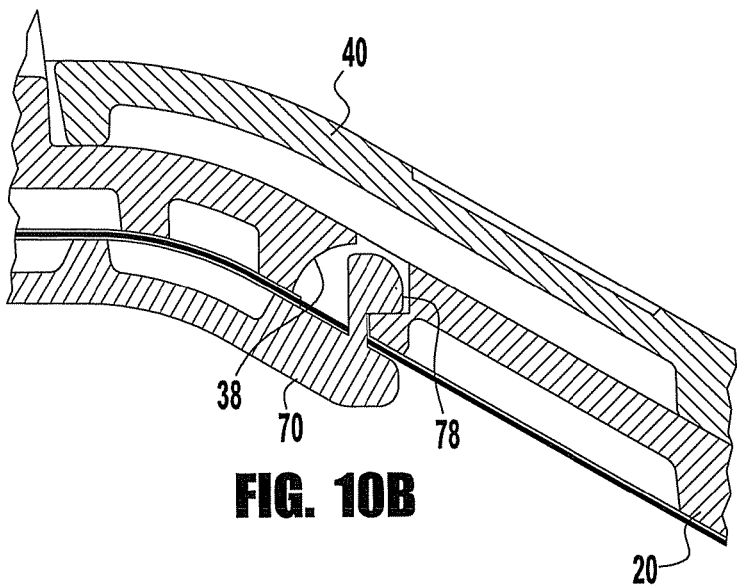
FIG. 10B is a side cross sectional view of another mounting member and bottom member attachment portion of a lockout device.

In one embodiment, to assist in securing a cover member to a bottom member for restricting access to an instrument, a latch member may be assembled with the bottom member and movable to a latching position in which the latch member holds the cover member in a closed position. The latch member may also assist in applying compressive gripping forces to the cinching portion of the strap when the cover member is in a closed position and the latch member is in a latching position. Many different latch members may be assembled with a bottom member for securing a cover member to the bottom member and/or for compressing the cover member against the bottom member. In one embodiment, as illustrated in FIGS. 9A-9C (and shown, for example, in the embodiment of FIGS. 5A-5B), a latch member comprises a latch plate 30 pivotally attached to the bottom member 20 at hinge portion 35. The latch plate 30 is pivotable to a latching position, shown in FIG. 9C, in which the latch plate 30 is pressed against the cover member 40 to hold the cover member 40 in a closed position, thereby securing gripping engagement of the cinching portion of the strap (not shown) with the cinching features 27, 47 of the bottom member 20 and cover member 40. To hold the latch plate 30 in the latching position, the latch plate may be configured such that a locking member secured to one of the locking apertures 24 obstructs movement of the latch plate 30 out of the latching position. As one example, as illustrated in FIGS. 9A-C, the latch plate may include alignment apertures 34 that align with the locking apertures 24 of the lock bar 21 when the cover member is in the closed position and the latch plate is in the latching position.

To enhance the gripping engagement of the cinching features 27, 47 on the strap 60, engaging surfaces of the latch plate 30 and the cover member 40 may include compression features having a compressible interference fit with each other, such that the latch member 30 forces the cover member 40 into tighter gripping engagement with the strap 40. The compression features may contact each other before the latch member 30 and cover member 40 reach a condition in which lockout is possible (for example, where the alignment apertures 34 are not yet aligned with the locking apertures 24, as shown in FIG. 9B). To permit lockout, the latch member 30 is pressed against the cover member 40, forcing the cinching features 47 of the cover member 40 into tighter or closer gripping engagement with the strap (not shown). As shown in FIGS. 5B and 9A-9C, the compression features may include ridges 46 and complementary shaped grooves or pockets 36. When the cover member 40 is in the closed position and the latch member 30 is moved to the latching position, the ridges 46 contact the pockets 36 before the alignment apertures 34 are aligned with the locking apertures 24, as shown in FIG. 9B. To align the two sets of apertures 24, 34 for lockout, the latch plate 30 is compressed against the cover member 40, forcing the ridges 46 deeper into the pockets 36 (see FIG. 9C), which applies gripping force to the strap. In one example, the ridges 46 on the cover member 40 may also provide structural stiffening or reinforcement to the portion of the cover member 40 from which the cinch pins 47 extend to prevent binding of the cinch pins 47.

To assemble a valve lockout device with a valve, a bottom member may be affixed directly or indirectly with the valve body, with the actuating member of the valve being received in an opening in the bottom member. In one embodiment, the valve lockout device may be provided with a mounting member that is connectable with the bottom member to mount the bottom member to the valve body. In the illustrated embodiment, a back plate or mounting member 70 is attached to the bottom member 20 for mounting the bottom member 20 to the valve body. The mounting member 70 is provided with an opening 73 (see FIGS. 2A and 2B) that aligns with the bottom member opening 23 to receive the actuating member therethrough. Many different mechanisms may be used to attach the mounting member to the bottom member, such as, for example, fasteners, adhesives, and interlocking engagements. In the illustrated embodiment shown in FIGS. 10A and 10B, flexible fingers or snaps 77 and hooks 78 extending from the mounting member 70 engage corresponding attachment slots 37, 38 in the bottom member 20 for a snap-fit engagement between the bottom member 20 and the mounting member 70. The mounting member 70 may also be provided with a strap slot 76 that aligns with the corresponding bottom member exit slot 26 to allow insertion of the locking strap 60. As shown in FIGS. 3 and 4, the mounting member strap slot 76 may be tapered outward to facilitate insertion of the strap 60. While many materials may be used to construct the mounting member, a resilient and durable plastic material may be chosen to provide flexibility to accommodate a snap fit engagement with the bottom member and thermal resistance to enable use with valves exposed to extreme temperatures. In one embodiment, the mounting member is provided in 5% glass filled polypropylene.

Additionally, engagement between the mounting member 70 and the bottom member 20 may be used to secure a first or fixed end 63 (FIG. 11C) of the strap 60 to the lockout device 10, for example, by holding the strap end 63 between the mounting member and the bottom member. While many different configurations may be used to secure the strap end 63, in the illustrated embodiment of FIGS. 11A-11C, the mounting member 70 includes anchor pins 72 (FIG. 11B) that pass through corresponding holes (not shown) in the strap end 63. The strap holes may, for example, be punched or die-cut, with the edges heat sealed to prevent fraying or tearing of the strap fibers around the holes. The anchor pins 72 may be received in corresponding anchor pockets 22 in the bottom member 20, as shown in the lower perspective view of FIG. 12 to stabilize the anchor pins 72 and limit shear forces on the pins 72 when the strap 60 is pulled.

The mounting member 70 may be provided with a mounting surface to securely engage the mating surface of the valve body. In the illustrated embodiment, as shown in the exploded view of FIG. 11B, the mounting surface includes a cushion pad 71 surrounding the mounting member opening 73 (see FIG. 4). The cushion pad 71 may be provided in a soft and/or compressible material, such as, for example, a closed cell foam material, such as EPDM (ethylene propylene diene monomer) foam rubber. During installation with the valve body, the cushion pad 71 may therefore deform to conform with the shape of the valve body, providing improved stability for the lockout device 10 and a tighter fit between the mounting member 70 and the valve body. The compressible cushion pad 71 also provides the user with a tactile cue when tightening the locking strap 60, as the "bottoming out" of the cushion pad 71 against the valve body during tightening will provide a noticeable increase in tension in the locking strap 60.

Figure 11B:
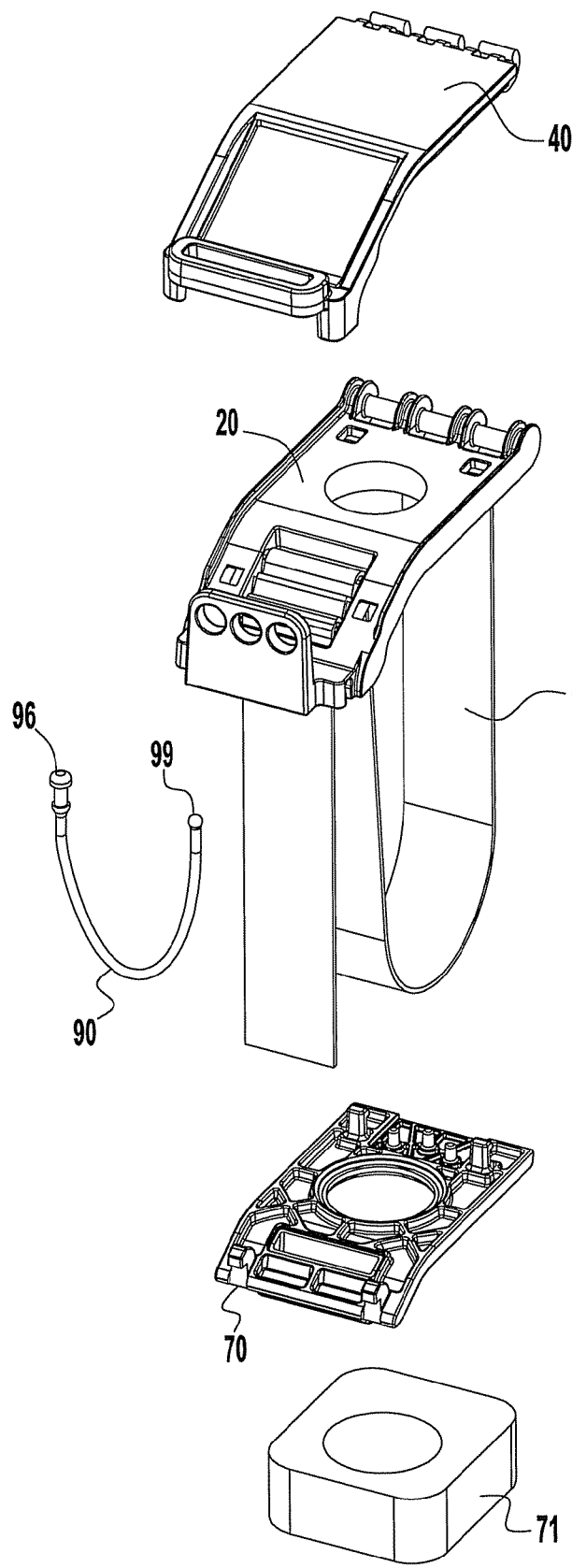
FIG. 11B is an exploded perspective view of the lockout device of FIG. 11A, shown without the enclosure.
Figure 11C:
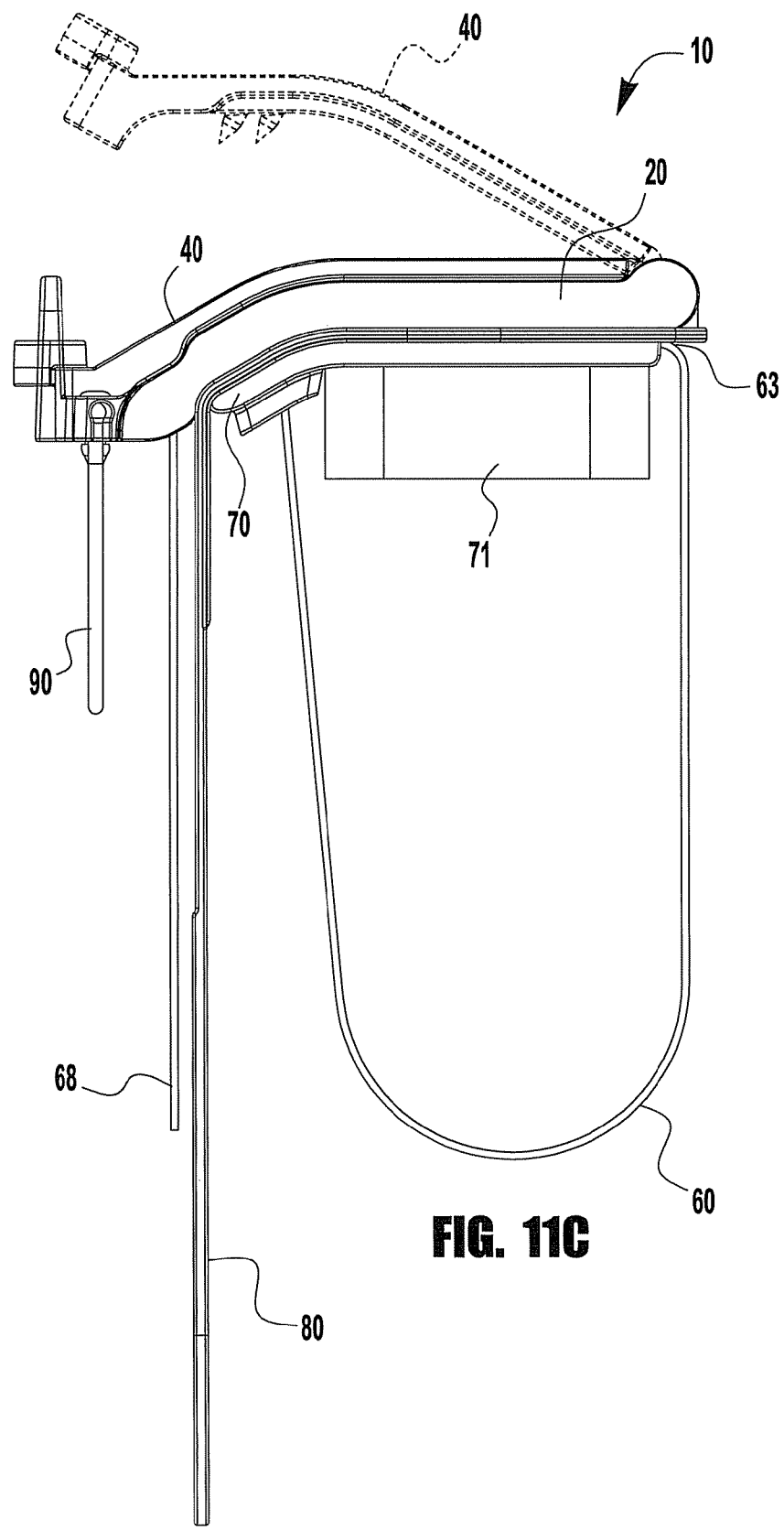
FIG. 11C is a side view of the lockout device of FIG. 11A.
Figure 12:
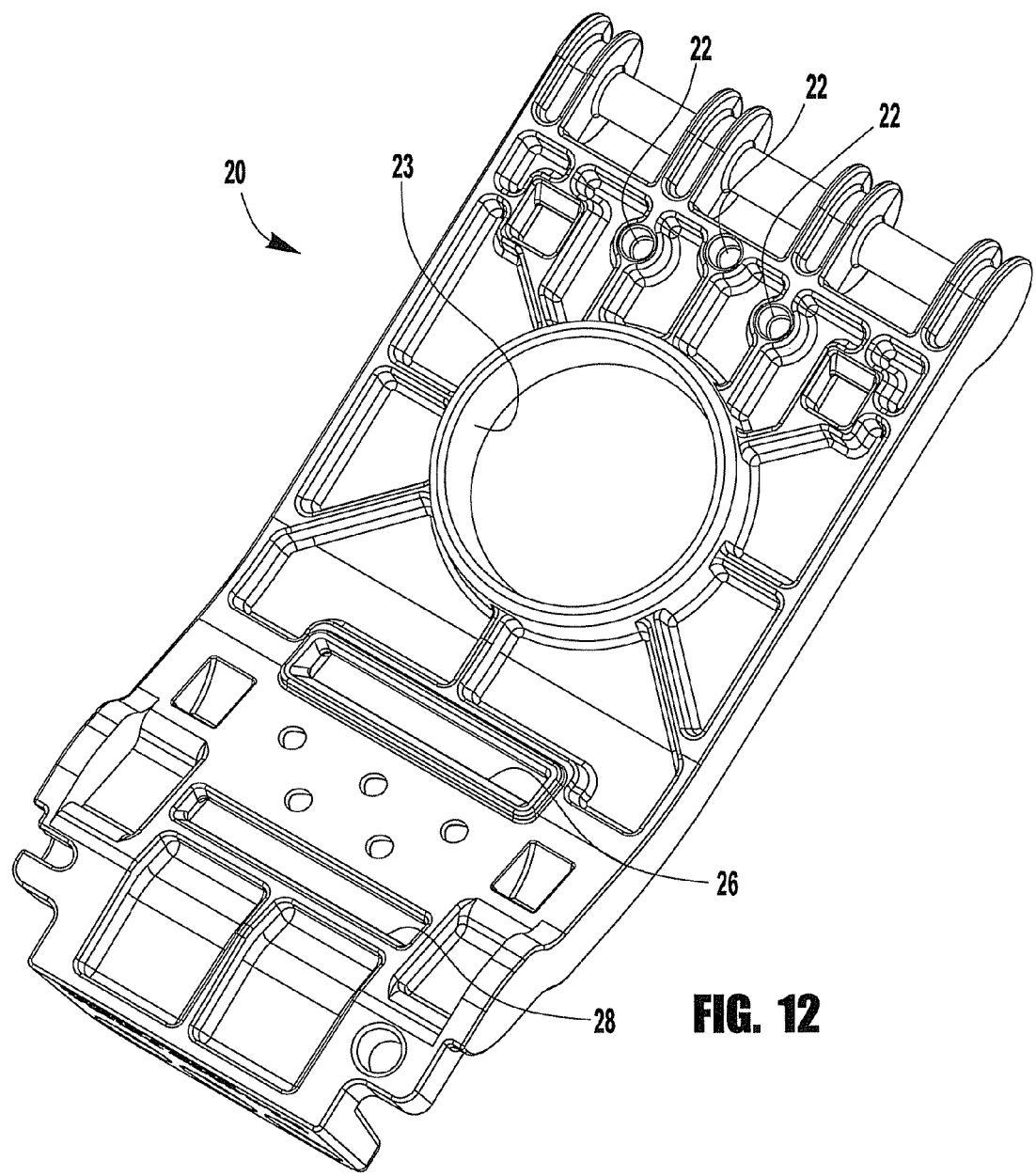
FIG. 12 is a bottom perspective view of the bottom member of the lockout device of FIG. 11A.
Figure 13:
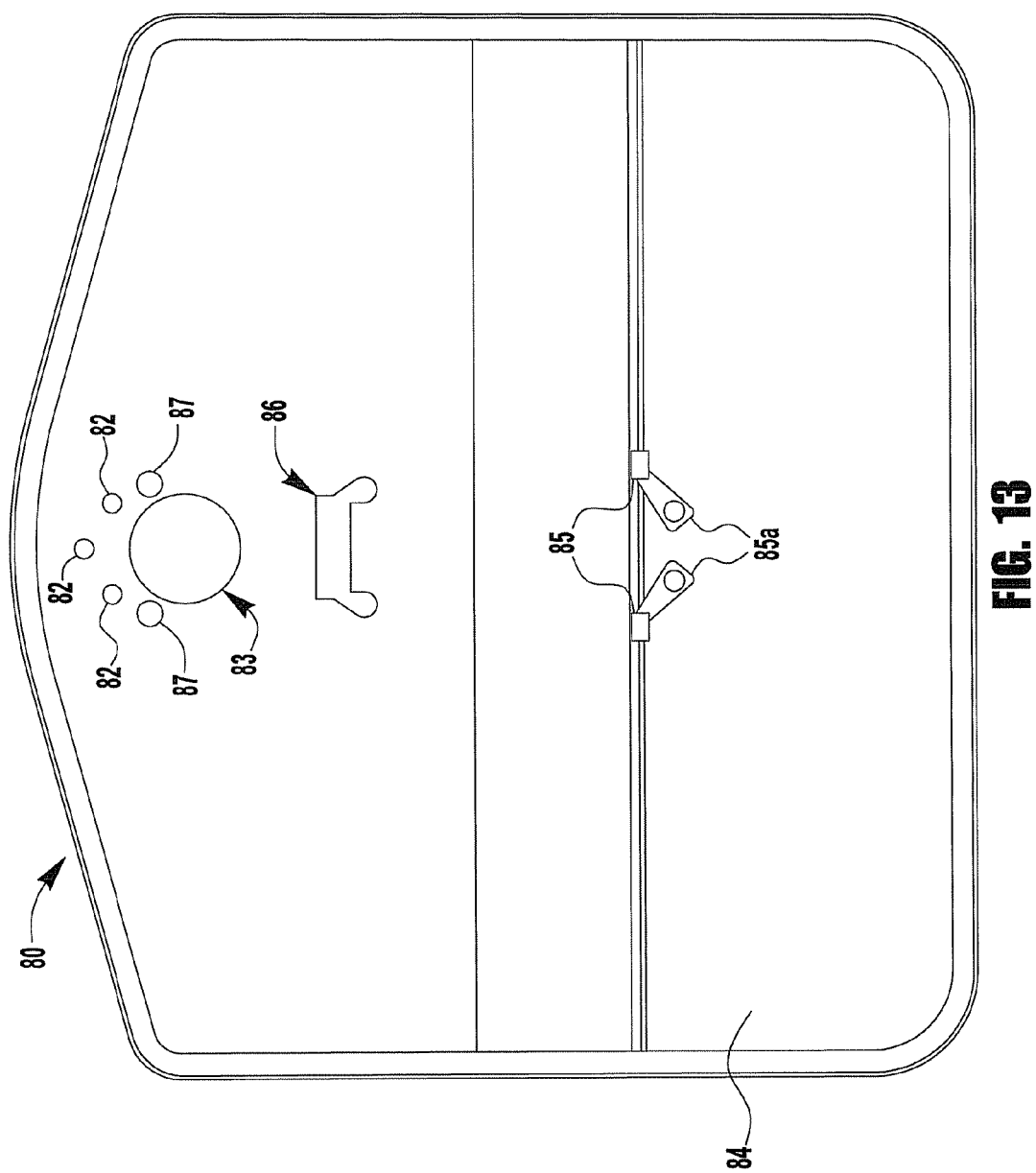
FIG. 13 is a front view of the enclosure of the lockout device of FIG. 11A.
Figure 14:
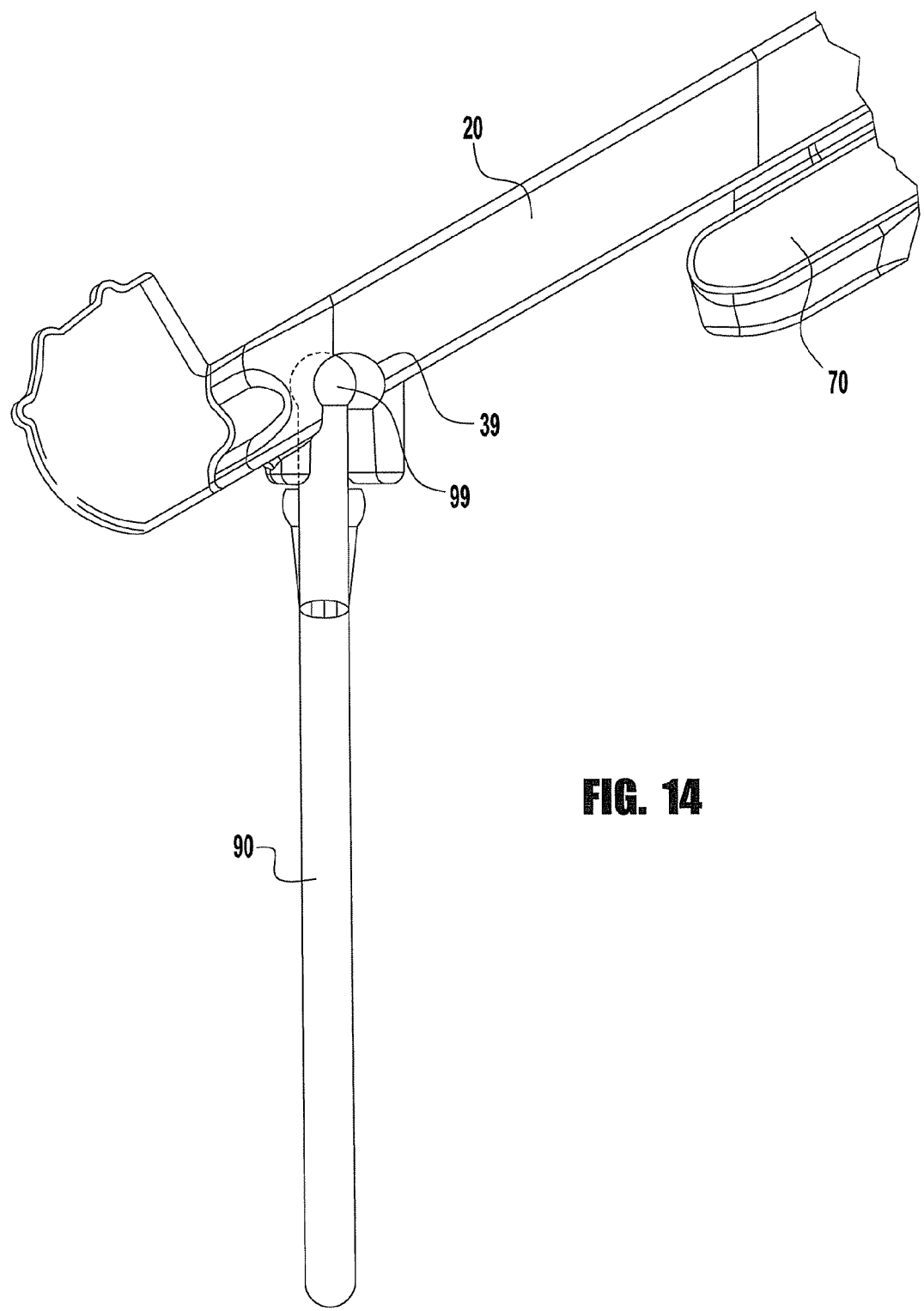
FIG. 14 is a side perspective view of a lanyard slot portion of a lockout device.

To further identify a valve's locked out condition and/or to further obstruct access to the locked out valve, the lockout device may be provided with an additional enclosure that covers the valve when the lockout device is assembled with the valve. The enclosure may take many different forms, such as, for example, a tube shaped enclosure through which the fluid system conduits can extend, or a sheet-type enclosure adapted to cover at least a portion of the valve body. In one embodiment, the enclosure may be provided in a flexible material for covering valves of varying shapes and sizes. The enclosure may be connected to a lower surface of a bottom member, such that the enclosure is disposed between the bottom member and the valve body when the lockout device is installed. In the illustrated embodiment, as shown in FIGS. 11A and 11C, the lockout device is provided with a durable sheet enclosure or bag portion 80 secured between the bottom member 20 and the mounting member 70. In another embodiment (not shown), such an enclosure may be attached to the first end 63 of the locking strap 60, for example, by sewing, gluing, or securing with fasteners, to provide an additional or alternative connection between the locking strap end 63 and the bottom member 20. As shown in FIG. 13, the exemplary enclosure 80 includes several openings 82, 83, 86, 87 to allow a portion of the enclosure 80 to be positioned between the mounting member 70 and the base member 20. Openings 82 that align with the anchor pins 72 and anchor pockets 22 allow the anchor pins 72 to be received in the anchor pockets 22. An opening 83 that aligns with the bottom member and mounting member openings 23, 73 allows the actuating member to be received through the mounting member and bottom member openings 73, 23. Opening 86 aligns with the strap slots 26, 76 to allow the locking strap 60 to be inserted through the strap slots 26, 76. Openings 87 align with the attachment slots 37, 38 to allow the bottom member 20 to attach to the mounting member 70. While many materials may be used to construct the enclosure, a durable plastic sheet material, such as a vinyl coated fabric may be chosen to provide durability and thermal resistance.

The enclosure may serve many functions, including, for example, providing identification of the locked out condition or the reason for lockout, providing markings showing illustrated or written instructions for installation and/or removal of the lockout device, covering the valve body to further obstruct access to the locked out valve, or providing a compartment for service instructions, valve or other fluid system components, or other items. In one embodiment, a closeable compartment may be provided for storing items, such as, for example, a handle detached from a valve prior to valve lockout and any mounting hardware used to assemble the handle to the actuating member, such as a valve stem nut or set screw. In the illustrated embodiment of FIG. 13, a storage pocket 84 is provided with a pair of zippers 85 for closure of the pocket. This arrangement provides for local and convenient access to the detached handle and mounting hardware when the locked out valve is to be returned to operation, while minimizing the risk of the valve handle and mounting hardware being lost during valve lockout.

The enclosure compartment may be locked closed to further minimize the likelihood of valve tampering or loss of the valve handle. Many mechanisms may be used to lock the compartment closed, such as the insertion of a padlock, cable or other locking member through openings in an open end of the compartment or through holes in the tabs of one or more zippers. In one embodiment, a lanyard may be provided with both ends attachable to the lockout device, such that the lanyard may be inserted through two zipper pulls or zipper tabs to hold the zippers together to prevent the compartment from being opened. In the illustrated embodiment, shown, for example, in FIGS. 5A and 14, a flexible lanyard 90 is provided with an enlarged anchor end 96 retained in a countersunk hole or anchor pocket 36 in the bottom member 20, and a flanged free end 99 receivable in a complementary shaped lanyard slot or receiver pocket 39 in the bottom member 20. To lock the pocket 84 closed, the zippers 85 are pulled together and the free end 99 of the lanyard 90 is inserted through the zipper tabs 85a. The free end 99 is then inserted into the lanyard slot 39 (see FIG. 14). When the cover member 40 is pivoted to the closed position, a side wall 59 (FIGS. 11B and 11C) on the cover member 40 covers the lanyard slot 39, thereby retaining the free end 99 of the lanyard 90 until the cover member 40 is returned to the open position. By using this mechanism, the pocket 84 remains locked closed as long as the lockout device 10 is in the lockout condition, and the pocket 84 may be opened, and the valve handle and/or other items accessed, as soon as the lockout device 10 is unlocked. While many materials may be used to construct the lanyard, a resilient and flexible plastic material may be chosen for ease of use. In one embodiment, the lanyard may be provided in low density polyethylene.

To use the exemplary valve lockout devices illustrated in FIGS. 2A-14 according to one exemplary method, the valve is first set to the desired condition for lockout, such as, for example, closed, open, or regulated flow (partially open) positions, by using the valve handle to manipulate the actuating member to achieve the desired valve condition. The handle is then removed from the actuating member, along with any associated mounting hardware. The valve handle and associated mounting hardware are placed in the pocket 84, and the zippers 85 are pulled together to close the pocket 84. The valve lockout device 10 is placed over the valve body such that the actuating member is received in aligned openings 73, 23 in the mounting member 70 and bottom member 20, and the cushion pad 71 is pressed against the upper surface of the valve body. The free end 99 of the lanyard 90 is inserted through the zipper tabs 85a and slid into the lanyard slot 39 in the bottom member 20.

The locking strap 60 is wrapped around the valve body, inserted through aligned strap slots 76, 26 in the mounting member 70 and bottom member 20, stretched across the bottom member holding portion 27, and inserted down through bottom member exit slot 28. The free end 68 of the locking strap 60 is pulled to tighten the strap around the valve body until an increase in tension is felt, resulting from the cushion pad 71 bottoming out against the valve body. The cover member 40 is pivoted from the open position to the lockout position (see FIG. 11C) with the lock bar 21 being received through the corresponding slot 41. In the embodiments of FIGS. 5A-5B and 9A-9C, to align the alignment apertures 34 of the latch plate 30 with the locking apertures 24 of the lock bar 21, the latch plate 30 is pivoted onto and pressed against the cover member 40, with the compression features 36, 46 compressed against each other to force the cover member 40 into tighter gripping engagement with the strap 60.

A locking member, such as a padlock, is inserted through one of the locking apertures 24 (and in the case of the embodiments of FIGS. 5A-5B and 9A-9C, also through alignment aperture 34) and is locked to maintain the insertion, which prevents movement of the cover member 40 to the open position both by obstructing withdrawal of the lock bar 21 from the corresponding opening 41.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

What is claimed is:

1. A lockout device for an instrument having a body and an actuating member extending from the body for operating the instrument, the lockout device comprising:
   a bottom member, adapted to be positioned over the body, the bottom member including a first holding surface and an aperture for receiving the actuating member;
   a cover member connectable to the bottom member for pivotable movement between a closed position and an open position, the cover member including a covering portion for covering the actuating member in the closed position, and a second holding surface adapted to abut the first holding surface in the closed position, wherein the cover member is pivotably connected to the bottom member at a hinge portion, with the bottom member aperture being disposed between the hinge portion and the first holding surface; and
   a flexible member having a first end connected to one of the bottom member and the cover member, wherein the bottom member and cover member are adapted to receive a cinching portion of the flexible member between the first and second holding-surfaces;
   wherein when the flexible member is wrapped around a portion of the body and received between the first and second holding surfaces and the cover member is in the closed position, the first and second holding surfaces prevent movement of the cinching portion of the flexible member;
   further wherein the bottom member further comprises a lock bar including at least one locking aperture sized to receive a padlock shackle therethrough, such that when the cover member is in the closed position, the insertion of a padlock shackle through the at least one locking aperture prevents movement of the cover member from the closed position to the open position.

2. The lockout device of claim 1, wherein the lock bar extends through an opening in the cover member when the cover member is in the closed position.

3. The lockout device of claim 1, wherein the first end of the flexible member is connected to the one of the bottom member and the cover member by an enclosure secured to the bottom member.

4. The lockout device of claim 1, wherein the first and second holding surfaces comprise first and second cinch pads having interlocking patterns.

5. The lockout device of claim 1, wherein the bottom member aperture is disposed between the hinge portion and the lock bar.

6. The lockout device of claim 1, wherein the lock bar extends through an opening in the cover member when the cover member is in the closed position.

7. The lockout device of claim 1, wherein the first end of the flexible member is connected to the one of the bottom member and the cover member by an enclosure secured to the bottom member.

8. The lockout device of claim 1, wherein the first and second holding surfaces comprise first and second cinch pads having interlocking patterns.

9. The lockout device of claim 1, wherein the bottom member aperture is disposed between the hinge portion and the first holding surface.

10. A method of locking out a valve having a valve body, a valve stem extending from the valve body for operating the valve, and a valve handle assembled with the valve stem for moving the valve stem to operate the valve, the method comprising:
    removing the valve handle from the valve stem;
    assembling a bottom member with the valve body, a first end of a flexible member being connected with the bottom member;
    wrapping a second end of the flexible member around a portion of the valve body;
    tightening the flexible member around the portion of the valve body such that a selected cinching portion of the flexible member is held against the bottom member; and
    securing a cover member with the bottom member such that the cover member covers the valve stem and the cover member holds the selected cinching portion of the flexible member fixed against the bottom member; and
    maintaining the valve handle separate from the covered valve stem.

11. The method of claim 10, wherein securing the cover member with the bottom member comprises inserting a lock bar extending from the bottom member through an opening in the cover member and securing a padlock shackle through a locking aperture in the lock bar.

12. The method of claim 10, further comprising inserting the flexible member through first and second slots in the bottom member to position the selected cinching portion against the bottom member.

13. The method of claim 10, wherein maintaining the valve handle separate from the covered valve stem comprises storing the valve handle in a compartment of an enclosure secured to the bottom member.

14. The method of claim 13, wherein the first end of the flexible member is connected to the bottom member by the enclosure.

15. The method of claim 10, wherein securing the cover member with the bottom member comprising engaging holding surfaces of the bottom member and cover member with the selected cinching portion of the flexible member to prevent movement of the cinching portion in a direction substantially parallel to the holding surfaces.

16. The method of claim 10, wherein the holding surfaces of the cover member and bottom member comprise first and second cinch pads having interlocking patterns.

17. A lockout device for an instrument having a body and an actuating member extending from the body for operating the instrument, the lockout device comprising:

a bottom member, adapted to be positioned over the body, the bottom member including a first holding surface and an aperture for receiving the actuating member;

a cover member connectable to the bottom member for pivotable movement between a closed position and an open position, the cover member including a covering portion for covering the actuating member in the closed position, and a second holding surface adapted to abut the first holding surface in the closed position; and a flexible member having a first end connected to one of the bottom member and the cover member, wherein the bottom member and cover member are adapted to receive a cinching portion of the flexible member between the first and second holding-surfaces;

wherein when the flexible member is wrapped around a portion of the body and received between the first and second holding surfaces and the cover member is in the closed position, the first and second holding surfaces prevent movement of the cinching portion of the flexible member;

further wherein the bottom member further comprises a lock bar including at least one locking aperture sized to receive a padlock shackle therethrough, such that when the cover member is in the closed position, the insertion of a padlock shackle through the at least one locking aperture prevents movement of the cover member from the closed position to the open position; and further wherein the cover member is pivotably connected to the bottom member at a hinge portion, with the bottom member aperture being disposed between the hinge portion and the lock bar.

* * * * *